United States Patent [19]

Merkovsky et al.

[11] Patent Number: 4,822,558

[45] Date of Patent: Apr. 18, 1989

[54] THIMBLE GUIDE EXTENDER FOR A NUCLEAR POWER PLANT

[75] Inventors: Daniel Merkovsky, Monroeville; Edward J. Rusnica, Greensburg, both of Pa.

[73] Assignee: Westinghouse Electric Corp., Pittsburgh, Pa.

[21] Appl. No.: 79,859

[22] Filed: Jul. 30, 1987

[51] Int. Cl.⁴ .............................................. G21C 17/00
[52] U.S. Cl. .................................... 376/347; 376/203; 376/245; 376/254; 376/292; 376/285
[58] Field of Search ............... 376/203, 245, 254, 285, 376/292, 352, 463, 347

[56] References Cited

U.S. PATENT DOCUMENTS

| 4,583,584 | 11/1986 | Wepfer | 376/285 |
|---|---|---|---|
| 4,637,914 | 1/1987 | Boyle et al. | 376/352 |
| 4,664,879 | 5/1987 | Blaushild | 376/352 |
| 4,708,842 | 11/1987 | Veronesi et al. | 376/203 |
| 4,716,004 | 12/1987 | Merkovsky et al. | 376/245 |
| 4,717,529 | 1/1988 | Merkovsky et al. | 376/245 |
| 4,728,479 | 3/1988 | Merkovsky | 376/203 |
| 4,746,488 | 5/1988 | Pradal et al. | 376/352 |
| 4,751,042 | 6/1988 | Ales et al. | 376/463 |
| 4,778,647 | 10/1988 | Gasparro | 376/245 |

FOREIGN PATENT DOCUMENTS

| 2592517 | 7/1987 | France | 376/254 |
|---|---|---|---|
| 1020668 | 2/1966 | United Kingdom | 376/352 |

Primary Examiner—Deborah L. Kyle
Assistant Examiner—Daniel Wasil
Attorney, Agent, or Firm—D. C. Abeles

[57] ABSTRACT

A sleeve-like sealing unit, particularly a thimble guide extender is adapted to be installed on and coaxially with a thimble guide mounted on a lower core plate of a nuclear reaction vessel and projects toward and terminates at a distance from an underface of a bottom nozzle forming part of a fuel assembly and supported on a top face of the lower core plate. The extender has a lower fitting adapted to surround the thimble guide at a bottom length portion thereof adjacent the top face of the lower core plate; and an upper fitting being axially displaceable relative to the lower fitting and being adapted to surround the thimble guide at a top length portion thereof. The upper fitting has an axial passage and a terminal opening defined by an outer annular radial face adapted to be in a face-to-face engagement with the underside of the bottom nozzle. The extender further has an axially compressible, generally cylindrical resilient bellows arranged between the lower and upper fittings generally in axial alignment therewith and being sealingly secured thereto. In an installed state of the extender the bellows is compressed and urges the annular radial face of the upper fitting into a sealing contact with underside of the bottom nozzle. A circumferential sealing arrangement is provided at the lower fitting and is adapted to sealingly surround the thimble guide in the installed state of the extender.

27 Claims, 3 Drawing Sheets

THIMBLE GUIDE EXTENDER FOR A NUCLEAR POWER PLANT

BACKGROUND OF THE INVENTION

This invention relates to a sleeve-like sealing unit, particularly an extender for a thimble guide in a nuclear power plant.

In a conventional pressurized water reactor vessel, in the lower portion thereof, a horizontal lower core plate extends, whose top face supports a large number of fuel assemblies each having a bottom nozzle. The bottom nozzle has a horizontal platform and spaced legs which extend downwardly therefrom and which stand on the lower core plate.

A number of measuring instruments are employed to promote safety and to permit proper control of the nuclear reaction. Among other measurements, a neutron flux map is generated periodically, for example, every 28 days, using data gathered by neutron flux detectors which are moved through a number of selected fuel assemblies. To guide the flux detectors during their periodic vertical travel parallel to the length dimension of the fuel rods of the fuel assemblies, stainless steel tubes known as flux thimbles extend through the bottom of the reactor vessel and into the selected fuel assemblies. Aligned vertical channels are provided in the reactor vessel wall, the lower core plate as well as the platform of the bottom nozzle of each selected fuel assembly to accommodate the thimble which thus vertically extends from the outside of the reactor vessel through the aligned passages to the top of the fuel assembly. The flux detector is inserted into the thimble and moved therein along the fuel assembly while the detected flux is recorded. During refuelling the thimbles are withdrawn from the reactor vessel and subsequently driven back into the fresh fuel assemblies.

For accurately guiding, supporting and stabilizing the thimble, into the thimble-receiving vertical passage of the lower core plate there is installed, at the top of the lower core plate, a thimble guide which is essentially a rigid sleeve member projecting from the top face of the lower core plate vertically towards the platform of the associated fuel assembly bottom nozzle and in which the thimble may slide. The upper terminus of the thimble guide is situated at an appreciable distance from the bottom face of the nozzle platform to prevent any abutting engagement between the thimble guide and the nozzle. Such an engagement, due to the rigid construction of both the thimble guide and the nozzle platform would adversely affect the stable footing of the bottom nozzle, sought to be ensured by an engagement between the bottom face of the nozzle legs and the top face of the lower core plate.

Due to the above-discussed spacing between the thimble guide and the underside of the nozzle platform, the thimble portion which bridges that distance is, in the absence of additional shroud arrangements, directly exposed to the coolant flow in the reactor vessel. Since considerable coolant turbulence exists during operation of the reactor in the region between the upper surface of the core plate and the lower surface of the lower nozzle platforms of the fuel assemblies, such turbulence may cause undesired vibration and wear of the thimbles. These phenomena are enhanced by the fact that, in the absence of a shielding arrangement, the coolant flowing upwardly through the thimble channel in the core plate and the thimble guide does not have a well-defined flow path leading into the thimble passage in the nozzle platform.

SUMMARY OF THE INVENTION

It is an object of the invention to provide a sleeve-like sealing unit, particularly a thimble guide extender which shieldingly surrounds the thimble particularly in the zone between the upper end of the rigidity mounted thimble guide and the underside of the fuel assembly nozzle platform; further, which effectively shields the thimble at all sides from exposure to the coolant flow and which sealingly engages the underside of the nozzle platform and sealingly surrounds a bottom part of the thimble guide at the top of the core plate without requiring close sliding fits between parts and allowing large manufacturing tolerances.

These objects and others to become apparent as the specification progtesses, are accomplished by the invention, acocrding to which, briefly stated, the extender has a lower fitting adapted to surround the thimble guide at a bottom length portion thereof adjacent the top face of the lower core plate; and an upper fitting being axially displaceable relative to the lower fitting and being adapted to surround the thimble guide at a top length portion thereof. The upper fitting has an axial passage and a terminal opening defined by an outer annular radial face adapted to be in a face-to-face engagement with the underside of the bottom nozzle. The extender furether has an axially compresible, generally cylindrical resilient bellows arranged between the lower and upper fittings generally in axial alignment therewith and being sealingly secured thereto. The bellows is compressed to a greater or lesser degree by the lower and upper fittings dependent upon axial distances therebetween. In an installed state of the extender the bellows is compressed and urges the annular radial face of the upper fitting into a sealing contact with the underside of the bottom nozzle. A circumferential sealing arrangement is provided at the lower fitting for sealingly surrounding the thimble guide in the installed state of the extender.

DESCRIPTIN OF THE PREFERRED EMBODIMENTS

Figure 1:
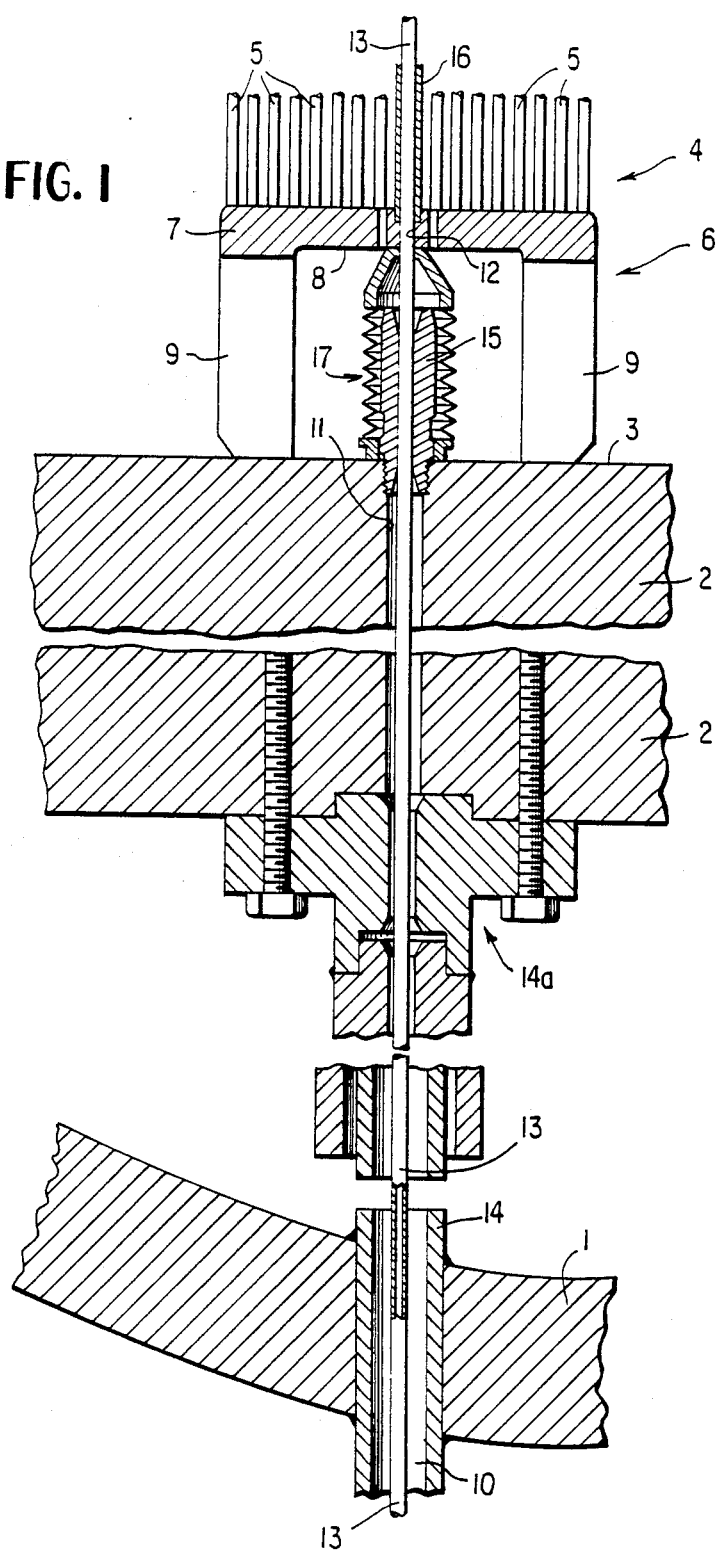
FIG. 1 is a schematic sectional fragmentary elevational view of one part of a reactor vessel incorporating the invention.

Turning to FIG. 1, a pressurized water reactor (not shown in detail) has a hemispherical bottom end wall 1 and supports a horizontal lower core plate 2, on the top face 3 of which there are supported fuel assemblies, of which one is shown and generally designated at 4. The fuel assembly 4 comprises a plurality of fuel rods 5 supported at their lower end by a bottom nozzle generally designated at 6. The nozzle 6 comprises a horizontal platform 7 having a bottom face or underside 8, as well as spaced legs 9 which extend downwardly from the platform 7 and stand on the top face 3 of the lower core plate 2, thus supporting upright the entire fuel assembly 4.

Through axially aligned vertical passages 10, 11 and 12 provided, respectively, in the reactor wall 1, the lower core plate 2 and the platform 7 there passes a thimble 13 which is a slender stainless tube reaching to the top part of the fuel assembly 4 at its upper end and projectin out of the reactor wall 1 in a downward direction to be associated with measuring instrumentation, not shown. The thimble 13 serves the purpose of guiding therein a probe (also not shown) which travels vertically along the length of the fuel assembly 4 to sense the neutron flux.

The thimble 13 is axially moved out of the fuel assembly during refueling and is subsequently reinserted into the fresh fuel assembly. In the zone between the reactor wall 1 and the lower core plate 2 the thimble 13 is surrounded by a permanently installed sleeve construction 14 whose securing elements and thimble guide components are generally designated at 14a.

A thimble guide 15 constituted by an elongated sleeve-like component is inserted at the upper end of the passage 11 of the lower core plate 2 and extends vertically upwardly, in alignment with the passage 12 provided in the nozzle platform 7. The thimble guide 15 is rigidly held—for example, by a tightened threaded connection—in the core plate 2. The thimble guide 15 serves as a sliding guide and for positioning and stabilizing the thimble 13. Above the nozzle platform 7 the thimble 13 is positioned within an instrumentation tube 16 extending upwardly from the platform 7 and forming a permanent part of the fuel assembly 4.

On the thimble guide 15 there is inserted an only symbolically shwon thimble guide extender generally designated at 17 for the particular purpose of providing a shield about the thimble 13 in the zone situated between the top of the thimble guide 15 and the underface 8 of the platform 7.

The thimble guide extender 17 constitutes a first preferred embodiment of the invention, now to be described in detail with reference to FIG. 2 in which the extender 17 is shown in its installed state.

The extender 17 has a longitudinal axis A and comprises a lower fitting 18 having a flange 19 and an upper fitting generally designated at 20, being vertically spaced from and generally in alignment with the lower fitting 18. The upper fitting 20 has a hollow cap 21 having an inner radial terminal shoulder 21a and provided with a passage 22 adapted to closely surround the thimble 13 (not shown in FIG. 2) and an integral or welded sleeve 23 having a radially inwardly extending flange 24 of downwardly flaring configuration at 25 and a narrow, annular contact area 25a.

A cylindrical bellows 26 of circumferentially closed configuration is sealingly welded at its top to a radial lower face of the sleeve 23 and is, at its bottom, sealingly welded to a radial top face of the flange 19 of the lower fitting 18. The bellows 26 is resiliently deformable in several directions and may be made, for example, of No. 316 stainless steel.

Within the bellows 26, coaxially therewith, there is arranged a retainer ring generally designated at 27 having an upper terminal radial face 31a. Approximately the lower two-thirds of the length of the retainer ring 27 is slit to form a plurality of circumferentially arranged, radially resilient legs 28 each having an inwardly extending bottom projection 29. The retainer ring 27 further has at its bottom, approximately at the axial location of the leg projections 29, radially outwardly extending ring segments 30. At the top of the retainer ring 27 there is formed a radially outwardly extending flange 31.

The retainer ring 27 is, at its lower part, in a stabilizing engagment with the inner face of the lower fitting 18 by means of the ring segments 30. At its upper portion, the retainer ring 27 is in circumferential engagement with the surrounding sleeve 23 of the upper fitting 20. The circumferential contact between the sleeve 23 and the retainer ring 27 is along the narrow, annular contact area 25a. Such small area contact permits a rocking motion of the upper fitting 20 relative to the retainer ring 27 about an axis transverse to the longitudinal extender axis A for purposes to become apparent as the specification progresses.

A cooperation between a lower radial face of the flange 31 of the retainer ring 27 and an upper radial face of the flange 24 of the sleeve 23 forming part of the upper fitting 20 limits an outwardly directed axial motion of the upper fitting 20 on the retainer ring 27 as urged by the bellows 26.

The cylindrical bellows 26 is spacedly and fully surrounded by a cylindrical shield 32 which is secured at its bottom part to the lower fitting 18 and which has an open top through which projects the sleeve 23 of the upper fitting 20.

The thimble guide extender 17 is installed on the thimble guide 15 previously secured to the lower core plate 2 from above, in the absence of the fuel assembly 4. For this purpose, the extender 17 is guided downwardly such that the tapered top part of the thimble guide 15 is introduced into the opening defined by the bottom part of the retainer ring 27 and is slid down thereon until the projections 29 of the respective legs 28 snap into a bottom circumferential groove 33 of the thimble guide 15. In this manner the retainer ring 27 is axially immobilized on the thimble guide 15 which closely fits into the retainer ring 27. In the absence of the fuel assembly 4 the biased bellows 26 ruges the sleeve 23 of the upper fitting 20 into abutting engagement with the flange 31 of the retainer ring 27 and, at the same time, the bellows 26 ruges the lower fitting 18 downwardly such that its smooth annular radial bottom face 18a surrounding the thimble guide 15 is in an annular contact with the top face 3 of the core plate 2.

The fuel assembly 4 is lowered onto the core plate 2 such that the passage 12 of the nozzle platform 7 is in alignment with the passage 22 of the upper fitting 20 of the extender 17. The length of the extender 17 is designed such that before the legs 9 of the fuel assembly nozzle 6 contact the upper face 3 of the core plate 2, the upper annular radial surface area 34 of the cap 21 engages the bottom face 8 of the nozzle platform 7 and, as the fuel assembly 4 continues to move downwardly, the bellows 26 is compressed by virture of the downwardly moving upper fitting 20 causing an increasing, axially oriented resilient force of the bellows 26 to be exerted downwardly on the lower fitting 18 and upwardly on the upper fitting 20. Since the lower fitting 18 is free to slide axially along the ring segments 30 on the lower part of the retainer ring 27, no spring forces are taken up by the retainer ring 27; these forces are applied axially downwardly on the lower fitting 18 further pressing it into engagement with the upper face 3 of the core plate 2.

The extender 17 is ready for use as the fuel assembly nozzle 7 assumes its supported position on the core plate 2 as shown in FIG. 1.

The upper fitting 20, particularly by virtue of the only narrow annular contact area 25a between the sleeve 23 and the outer face of the retainer ring 27, is capable of executing a slight rocking motion about an axis transverse to the longitudinal extender axis A, readily permitted by the resilient bellows 26. By virtue of such rocking motion any deviation from a strict parallelism between the underside 8 of the nozzle platform 7 and the top face 3 of the core plate 3 and/or between the upper radial annular face 34 of the upper fitting 20 and the bottom annular face 18a of the lower fitting 18 are compensated for and thus face-to-face, sealing engagements between the upper fitting 20 and the platform 7 as well as between the lower fitting 18 and the core plate 2 are ensured.

By virtue of the bellows construction and the above-described sealing engagement of the extender 17 with the bottom nozzle 7 and the core plate 2, the inside of the extender 17 is sealed from the surrounding environment, that is, the region between the core plate 2 and the platform 7 of the lower nozzle 6, without the need of accurately fitting, relatively sliding extender parts.

Further, by virtue of its sealing contact with the underside 8 of the nozzle platform 7, the cap 21 of the upper fitting 20 seals the passage 12 in the nozzle platform from the surrounding environment and, with its upwardly tapering outer conical face allows the coolant water into platform passages 35 situated adjacent the thimble passage 12.

Thus, the thimble extender 17 sufficient shields the thimble 15 from the coolant flow turbulences in the zone between the upper end of the thimble guide 15 and the underface 8 of the nozzle platform 7 and also in the passage 12 and the adjoining instrumentation tube 16. In sealing this area, the extender 17 defines a continuous flow path through the sleeve construction (instrumentation column) 14, the passage 11 and the instrumentation tube 16. By virtue of an orifice (not shown) at the top of the instrumentation tube 16 a reduced flow is obtained through this flow path, resulting, in turn, in smaller forces thus reducing the vibration-causing effect thereof.

The cylindrical shield 32 surrounding the bellows 26 protects the bellows from flow turbulences that may cause vibrations thereof and further may be used —by virtue of the cooperation of its upper edge 36 with the underface 37 of teh sleeve 23—to limit the downward axial sliding motion of the upper fitting 20, thus preventing an excessive compression of the bellows 26 particularly during installation of the extender 17 on the thimble guide 15. Such a limiting effect may also be obtained by the cooperation beetween the radial face 21a of the cap 21 and the radial face 31a of the retainer ring 27.

Figure 2:
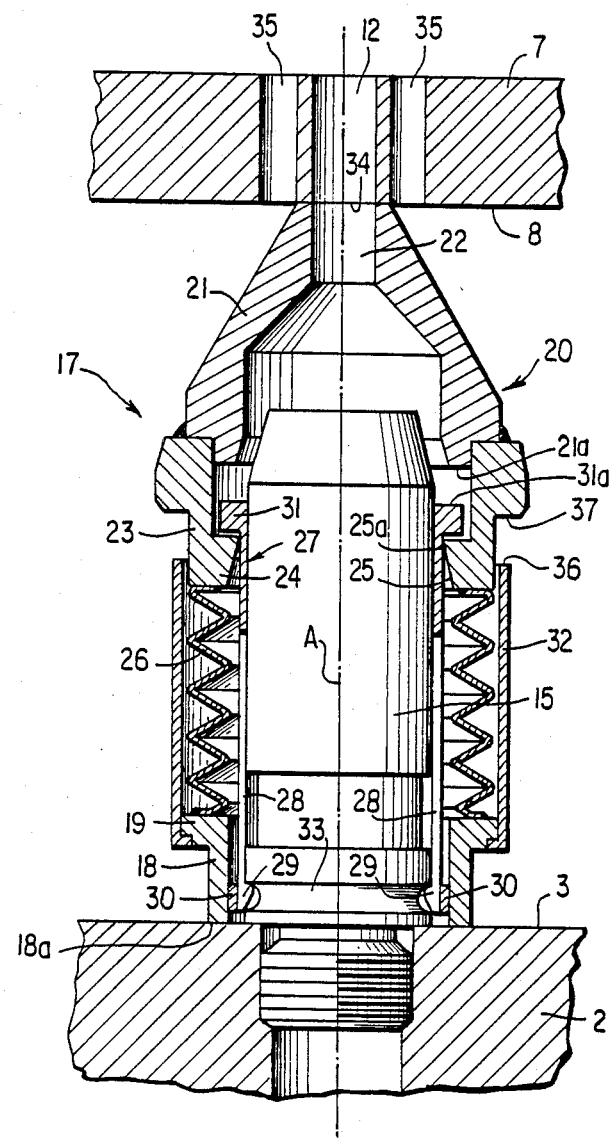
FIG. 2 is an axial sectional view of a preferred embodiment of the invention shown on an enlarged scale relative to FIG. 1.
Figure 3:
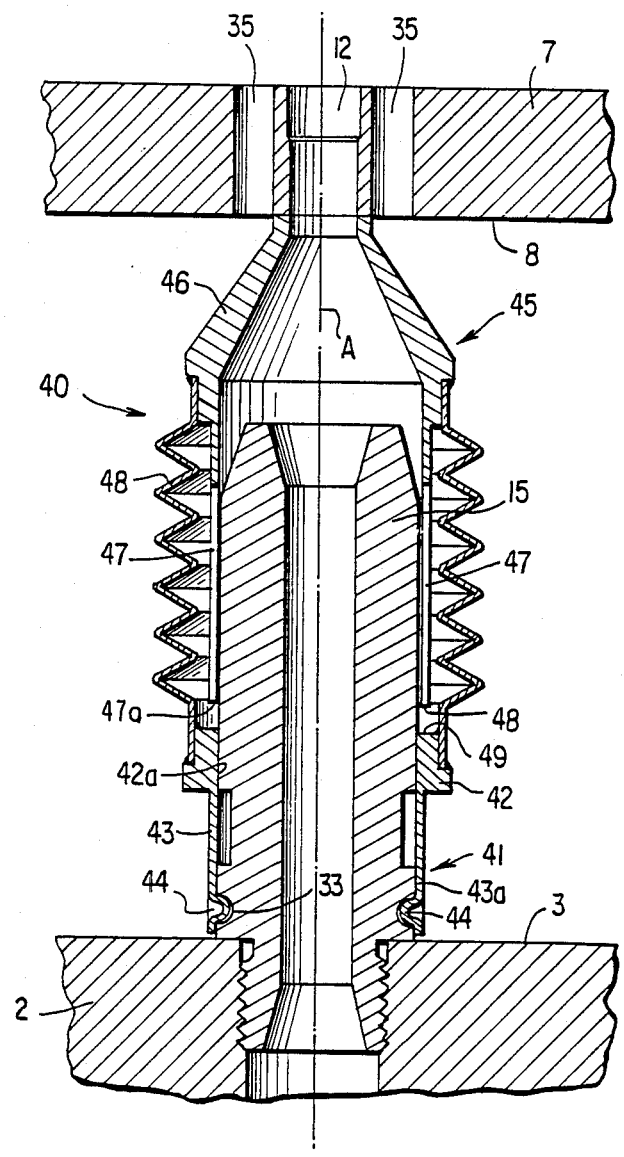
FIG. 3 is an axial sectional view of another preferred embodiment of the invention shown on an enlarged scale relative to FIG. 1.

In FIG. 3 there is illustrated a thimble guide extender 40 constituting a second preferred embodiment of the invention and shown—similarly to the FIG. 2 embodiment—in its installed state, surrounding thimble guide 15 which is shown in section.

The extender 40 comprises a lower fitting generaly designated at 41 having a radially outwardly oriented flange 42 at its upper portion and a cylindrical skirt 43 extending downwardly from the flange 42 and having, at its bottom part, a plurality of circumferentially distributed, radially inwardly projecting resilient locating fingers 44.

An upper fitting generally designated at 45 has a cap 46 and a plurality of downwardly extending circumferentially distributed radially resilient fingers 47. The lower and upper fittinsg 41 and 45 are interconnected by a cylindrical, circumferentially closed resilient bellows 48 welded at the top to the lower part of the cap 46 and, at the bottom to the flange 42 of the lower fitting 41.

Installation of the thimble guide extender 40 onto the thimble guide 15 is effected in a manner similar to that described in connection with the first embodiment. Thus, the upper conical terminus of the thimble guide 15 is, as the extender 40 is lowered, introduced into the bottom opening defined by the skirt 43 of the lower fitting 412 and the extender 40 is pushed down until the locating fingers 44 snap into the circumferential groove 33 of the thimble guide 15. The inner wall 42a of the flange 42 and the inner wall 43a of the lower part of the skirt 43 engage the respective outer surface portions of the thimble guide 15 with a close, sealing fit and by virtue of the locating fingers 44 engaging into the groove 33, the lower fitting 41 is axially immobilized on the lower part of the thimble guide 15.

The sealing engagement with the bottom face 8 of the nozzle platform 7 and the upper annular face of the cap 46 is effected by the resilient force of the bellows 48. In this embodiment, however, the spring force of the bellows 48 is taken up at the bottom by the locating fingers 44 in the groove 33 of the thimble guide 15 and also, if required, by contact between the base of the skirt 43 with the top face 3 of the core plate 2. The lower seal is therefore effected by virtue of the close fit, between the lower fitting 41 and the thimble guide 15, rather than between the top face 3 of the core plate 2 and the lower edge of the skirt 43.

The resilient finger 47 of the upper fitting 45 guidingly surrounding the thimble guide 15 permit a rocking motion of the upper fitting 45 about an axis transverse to the longitudinal axis A with the same result and advantages as described in connection with the first embodiment. Also similarly to the first embodiment, the resilient bellows 48 provides a fluidtight closure for the inside of the extender 40 without the need of small tolerances or closely interfitting, operationally sliding extender components.

For limiting the extent of compression of the bellows 48, particularly during installation, that is, for limigint the relative motion between the lower fitting 41 and the upper fitting 45, the lower ends 47a of the fingers 47 are in alignment with an upper radial face 49 of the flange 42 of the lower fitting 41 whereby these components are brought into an abutting relationship upon a predetermined motion path which compresses the bellows 48.

While in the two described preferred embodiments the sleeve-like sealing unit serves as an extender of and cooperates with a thimble guide mounted on a core plate, it is to be understood that the sleeve-like bellows-equipped sealing unit of the invention may find application in an environment which does not include a thimble guide.

It will be understood that the above description of the present invention is susceptible to various modifications, changes and adaptations, and the same are intended to be comprehended within the meaning and range of equivalents of the appended claims.

What is claimed is:

1. An extender in combination with a thimble guide, and a lower core plate of a nuclear reactor; said extender having a longitudinal axis and being installed on and coaxially with said thimble guide mounted on said lower core plate of a nuclear reactor vessel and projecting toward and terminating at a distance from an underface of a bottom nozzle forming part of a fuel assembly and supported on a top face of said lower core plate, comprising (a) a lower fitting surrounding said thimble guide at a bottom length portion thereof adjacent said top face of said lower core plate;

(b) an upper fitting being axially displaceable relative to the lower fitting and surrounding said thimble guide at a top length portion thereof; said upper fitting having an axial passage and a terminal opening defined by an outer annular radial face adapted to be in a face-to-face engagement with said underside of said bottom nozzle;

(c) an axially compressible, generally cylindrical resilient bellows arranged between said lower and upper fittings generally in axial alignment therewith and being sealingly secured thereto; said bellows being compressed to a greater or lesser degree by said lower and upper fittings dependent upon axial distances therebetween; in an installed state of said fuel assembly said bellows being compressed and urging said annular radial face of said upper fitting into a sealing contact with said underside of said bottom nozzle; and (d) circumferential sealing means provided at said lower fitting and sealingly surrounding the thimble guide.

2. The combination as defined in claim 1, further comprising an annular securing means circumferentially engaging the thimble guide for coaxially positioning said extender thereon.

3. The combination as defined in claim 2, said thimble having a circumferential groove; said annular securing means comprising a retainer ring fitting closely on said thimble guide; said retainer ring having a plurality of axially extending, radially resilient legs having a radially inwardly oriented projection radially adjacent said lower fitting; said projection of each said resilient leg engaging into said circumferential groove of the thimble guide; said upper fitting having a circumferential portion surrounding and axially slidably engaging an outer face of said retainer ring.

4. The combination as defined in claim 3, wherein said lower fitting is axially slidable with respect to said retainer ring and has a radial annular end face constituting said circumferential sealing means sealingly engaging said upper face of said core plate; said bellows urging said lower fitting into contact with said upper face of said core plate.

5. The combination as defined in claim 4, wherein said retainer ring comprises stabilizing means being in a sliding contact with said lower fitting.

6. The combination as defined in claim 5, wherein said stabilizing means comprises a plurality of flange segments circumferentially arranged on said retainer ring and projecting radially outwardly therefrom.

7. The combination as defined in claim 3, wherein said circumferential portion axially slidingly engaging said retainer ring is sufficiently narrow to allow a rocking motion of said upper fitting with respect to said retainer ring about an axis transverse to said longitudinal axis.

8. The combination as defined in claim 3, wherein said upper fitting has a radially inwardly oriented flange member and said retainer ring has a radially outwardly oriented flange member; said flange members being arranged to abut one another for limiting the extent of the axial motion of said upper fitting away from said lower fitting.

9. The combination as defined in claim 1, further comprising a cylindrical shield arranged generally coaxially about said bellows and being fastened to said lower fitting; said sheild entirely surrounding said bellows at any relative axial position between said lower and upper fittings.

10. The combination as defined in claim 9, wherein said shield has a terminal peripheral edge oriented towards said upper fitting; said upper fitting having an annular shoulder arranged to abut said terminal peripheral edge at a predetermined minimum distance between said lower and upper fittings for limiting a maximum compressin of said bellows.

11. The combination as defined in claim 1, wherein said lower fitting has an inner wall surface forming said circumferential sealing means and circumferentially sealingly engaging outer annular surface portions of said thimble guide.

12. The combination as defined in claim 11, wherein said thimble guide has a circumferential groove; further wherein said lower fitting has a plurality of radially inwardly oriented resilient fingers engaging into said circumferential groove of said thimble guide.

13. The combination as defined in claim 1, wherein said upper fitting has a plurality of circumferentially distributed, axially extending resilient fingers engaging the thimble guide while allowing a rocking motion of said upper fitting relative to said lower fitting about an axis transverse to said longitudinal axis.

14. The combination as defined in claim 13, wherein each said resilient finger has a free end oriented towards said lower fitting; said lower fitting having an annular shoulder arranged to abut the free ends of said resilient fingers at a predetermined minimum distance between said lower and upper fittings for limiting a maximum compression of said bellows.

15. An extender having a longitudinal axis and adapted to be installed on a thimble guide mounted on a lower core plate of a nuclear reactor vessel, comprising (a) a lower fitting;

(b) an upper fitting being generally in an axial alignment with the lower fitting and being axially displaceable relative to the lower fitting; said upper fitting having an axial passage and a terminal opening defined by an outer annular radial face;

(c) an axially compressible, generally cylindrical resilient bellows arranged between said lower and upper fittings generally in axial alignment therewith and being sealingly secured thereto; said bellows being compressed to a greater or lesser degree by said lower and upper fittings dependent upon axial distances therebetween;

(c) circumferential sealing means provided at said lower fitting; and (e) an annular securing means mounted coaxially with said longitudinal axis for circumferentially engaging the thimble guide to coaxially position said extender thereon.

16. An extender as defined in claim 15; having a plurality of axially extending, radially resilient legs having a radially inwardly oriented projection radially adjacent said lower fitting; said upper fitting having a circumferential portion surrounding and axially slidably engaging an outer face of said retainer ring.

17. An extender as defined in claim 16, wherein said lower fitting is axially slidable with respect to said retainer ring and has a radial annular end face constituting said circumferential sealing means.

18. An extender as defined in claim 17, wherein said retainer ring comprises stabilizing means being in a sliding contact with said lower fitting.

19. An extender as defined in claim 18, wherein said stabilizing means comprises a plurality of flange segments circumferentially arranged on said retainer ring and projecting radially outwardly therefrom.

20. An extender as defined in claim 16, wherein said circumferential portion axially slidingly engaging said retainer ring is sufficiently narrow to allow a rocking motion of said upper fitting with respect to said retainer ring about an axis transverse to said longitudinal axis.

21. An extender as defined in claim 16, wherein said upper fitting has a radially inwardly oriented flange member and said retainer ring has a radially outwardly oriented flange member; said flange members being arranged to abut one another for limiting the extent of the axial motion of said upper fitting away from said lowre fitting.

22. An extender having a longitudinal axis and adapted to be installed on a thimble guide mounted on a lowe core plate of a nuclear reactor vessel, comprising
  (a) a lower fitting;
  (b) an upper fitting being generally in an axial alignment with the lower fitting and being axially displaceable realtive to the lower fitting; said upper fitting having an axial passage and a terminal opening defined by an outer annular radial face;
  (c) an axially compressible, generally cylindrical resilient bellows arranged between said lower and upper fittings generally in axial alignment therewith and being sealingly secured thereto; said bellows being compressed to a greater or lesser degree by said lower and upper fittings dependent upon axial distances therebetween;
  (d) circumferential sealing means provided at said lower fitting; and
  (e) a cylindrical shield arranged generally coaxially about said bellows and being fastened to said lower fitting; said shield entirely surrounding said bellows at any relative axial position between said lower and upper fittings.

23. An extender as defined in claim 22, wherein said shield has a terminal peripheral edge oriented towards said upper fitting; said upper fitting having an annular shoulder arranged to abut said terminal peripheral edge at a predetermined minimum distance between said lower and upper fittings for limiting a maximum compression of said bellows.

24. An extender having a longitudinal axis and adapted to be installed on a thimble guide mounted on a lower core plate of a nuclear reactor vessel, comprising
  (a) a lower fitting having an inner wall surface comprising circumferential sealing means for sealingly surrounding the thimble guide;
  (b) an upper fitting being generally in an axial alignment with the lower fitting and being axially displaceable relative to the lower fitting; said upper fitting having an axial passage and a terminal opening defined by an outer annular radial face; and
  (c) an axially compressible, generally cylindrical resilient bellows arranged between said lower and upper fittings generally in axial alignment therewith and being sealingly secured thereto; said bellows being compressed to a greater or lesser degree by said lower and upper fittings dependent upon axial distances therebetween.

25. An extender as defined in calim 24 wherein said lower fitting has a plurality of radially inwardly oriented resilient fingers.

26. An extender having a longitudinal axis and adapted to be installed on a thimble guide mounted on a lower core plate of a nuclear reactor vessel, comprising
  (a) a lower fitting;
  (b) an upper fitting being generally in an axial alignment with the lower fitting and being axially displaceable relative to the lower fitting; said upper fitting having an axial passage and a terminal opening defined by an outer annular radial face; said upper fitting having a plurality of circumferentially distributed, axially extending resilient fingers for engaging the thimble guide while allowing a rocking motion of said upper fitting relative to said lower fitting about an axis transverse to said longitudinal axis;
  (c) an axially compressible, generally cylindrical resilient bellows arranged between said lower and upper fittings generally in axial alignment therewith and being sealingly secured thereto; said bellows being compressed to a greater or lesser degree by said lower and upper fittings dependent upon axial distances therebetween;
  (d) circumferential sealing means provided at said lower fitting; and
  (e) an annular securing means mounted coaxially with said longitudinal axis for circumferentially engaging the thimble guide to coaxially position said extender thereon.

27. An extender as defined in claim 26, wherein each said resilient finger has a free end oriented towards said lower fitting; said lower fitting having an annular shoulder arranged to abut the free ends of said resilient fingers at a predetermined minimum distance between said lower and upper fittings for limiting a maximum compression of said bellows.

* * * * *